(12) United States Patent
Nissan et al.

(10) Patent No.: US 9,256,596 B2
(45) Date of Patent: Feb. 9, 2016

(54) LANGUAGE MODEL ADAPTATION FOR SPECIFIC TEXTS

(71) Applicant: NICE-SYSTEMS LTD, Ra'anana (IL)

(72) Inventors: Maor Nissan, Herzliya (IL); Shimrit Artzi, Kfar Saba (IL); Ronny Bretter, Kiriyat Motzkin (IL)

(73) Assignee: NICE-SYSTEMS LTD, Ra'anana (IL)

( * ) Notice: Subject to any disclaimer, the term of this patent is extended or adjusted under 35 U.S.C. 154(b) by 29 days.

(21) Appl. No.: 14/307,520

(22) Filed: Jun. 18, 2014

(65) Prior Publication Data

US 2015/0370784 A1    Dec. 24, 2015

(51) Int. Cl.
*G06F 17/28* (2006.01)
*G06F 17/27* (2006.01)

(52) U.S. Cl.
CPC ........ *G06F 17/2809* (2013.01); *G06F 17/2795* (2013.01)

(58) Field of Classification Search
CPC .................................................. G06F 17/2809
See application file for complete search history.

(56) References Cited

U.S. PATENT DOCUMENTS

| | | |
|---|---|---|
| 7,584,092 B2 | 9/2009 | Brockett et al. |
| 2006/0106595 A1* | 5/2006 | Brockett ............. G06F 17/2785 704/9 |
| 2011/0060712 A1* | 3/2011 | Harashima ........ G06F 17/30684 706/47 |
| 2013/0262106 A1 | 10/2013 | Eyal Hurvitz et al. |

OTHER PUBLICATIONS

Zhao, B., Eck, M., & Vogel, S. (Aug. 2004). Language model adaptation for statistical machine translation with structured query models. In Proceedings of the 20th international conference on Computational Linguistics (p. 411). Association for Computational Linguistics.*

Eck, M., Vogel, S., & Waibel, A. (May 2004). Language Model Adaptation for Statistical Machine Translation Based on Information Retrieval. In LREC.*

Koehn, Philipp, and Josh Schroeder, "Experiments in domain adaptation for statistical machine translation", Proceedings of the Second Workshop on Statistical Machine Translation, Association for Computational Linguistics, 2007.

Zhao, Bing, Matthias Eck, and Stephan Vogel, "Language model adaptation for statistical machine translation with structured query models", Proceedings of the 20th international conference on Computational Linguistics, Association for Computational Linguistics, 2004.

* cited by examiner

*Primary Examiner* — King Poon
*Assistant Examiner* — Ibrahim Siddo
(74) *Attorney, Agent, or Firm* — Soroker-Agmon

(57) ABSTRACT

A computerized method for adapting a baseline language model, comprising obtaining a textual corpus of documents that comprise textual expressions, incorporating in the baseline language model textual expressions from documents which are determined as relevant to a provided target text based on a plurality of different relevancy determinations between the documents and the provided target text, thereby adapting the baseline language model to form an adapted language model for recognizing terms of a context of the provided target text, wherein the method is automatically performed on an at least one computerized apparatus configured to perform the method.

6 Claims, 5 Drawing Sheets

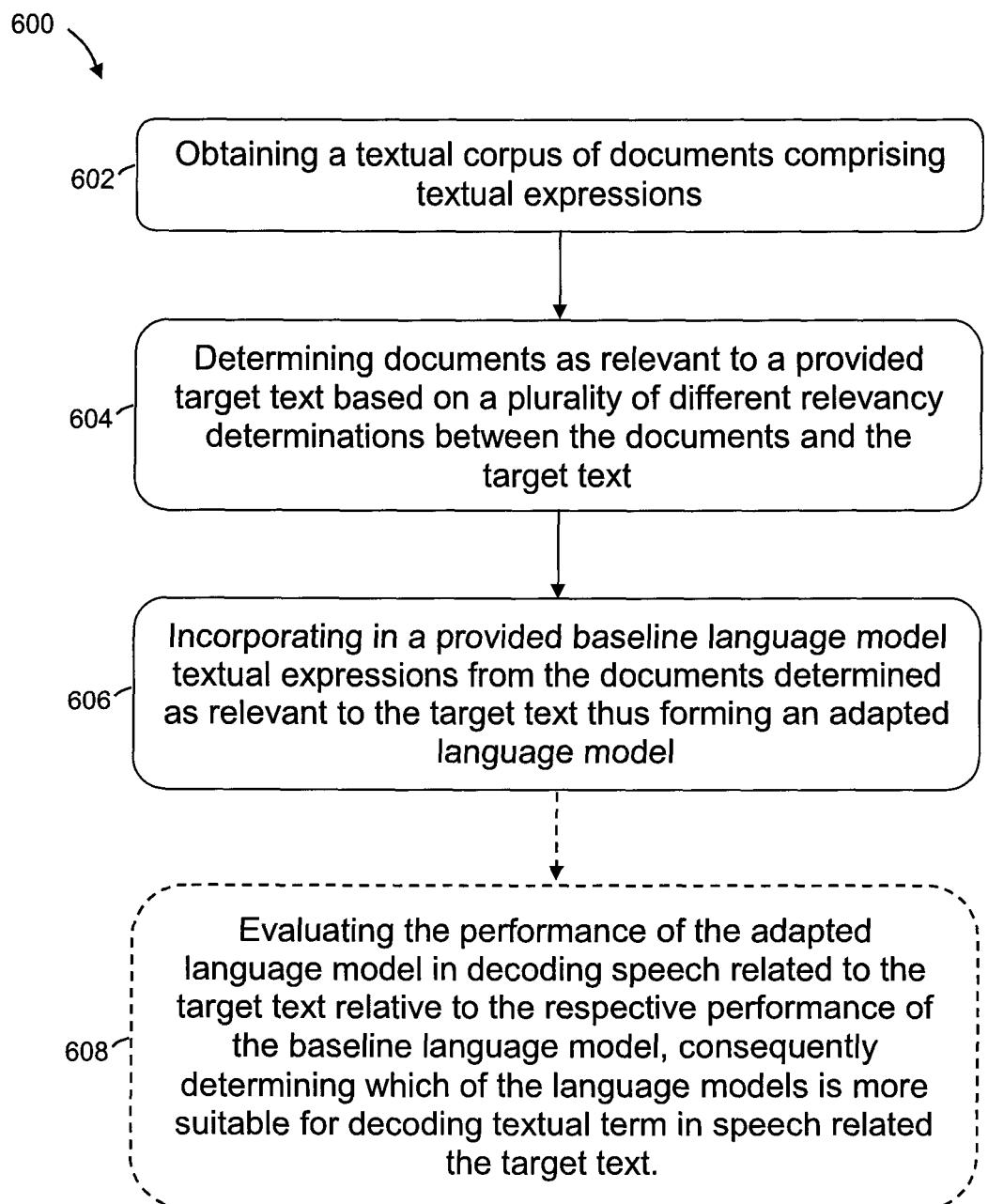

LANGUAGE MODEL ADAPTATION FOR SPECIFIC TEXTS

BACKGROUND

The present disclosure generally relates to language models for speech recognition, and more specifically to enhancing a language model according to contents of a textual corpus.

Certain approaches for adapting or enhancing language models are known in the art. Some related publications are listed below.

Koehn, Philipp, and Josh Schroeder, "Experiments in domain adaptation for statistical machine translation", Proceedings of the Second Workshop on Statistical Machine Translation, Association for Computational Linguistics, 2007;

Zhao, Bing, Matthias Eck, and Stephan Vogel, "Language model adaptation for statistical machine translation with structured query models", Proceedings of the 20th international conference on Computational Linguistics, Association for Computational Linguistics, 2004;

U.S. Pat. No. 7,584,092; or US application publication 2013/0262106.

SUMMARY

One exemplary embodiment of the disclosed subject matter is a computerized method for adapting a baseline language model, comprising obtaining a textual corpus of documents that comprise textual expressions, incorporating in the baseline language model textual expressions from documents which are determined as relevant to a provided target text based on a plurality of different relevancy determinations between the documents and the provided target text, thereby adapting the baseline language model to form an adapted language model for recognizing terms of a context of the provided target text, wherein the method is automatically performed on an at least one computerized apparatus configured to perform the method.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, and may not be repeatedly labeled and/or described.

Figure 1:
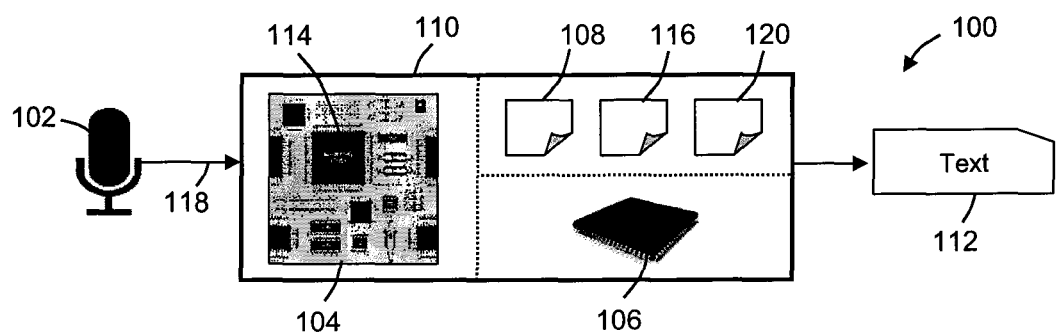

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

References to previously presented elements are implied without necessarily further citing the drawing or description in which they appear.

Figure 2:
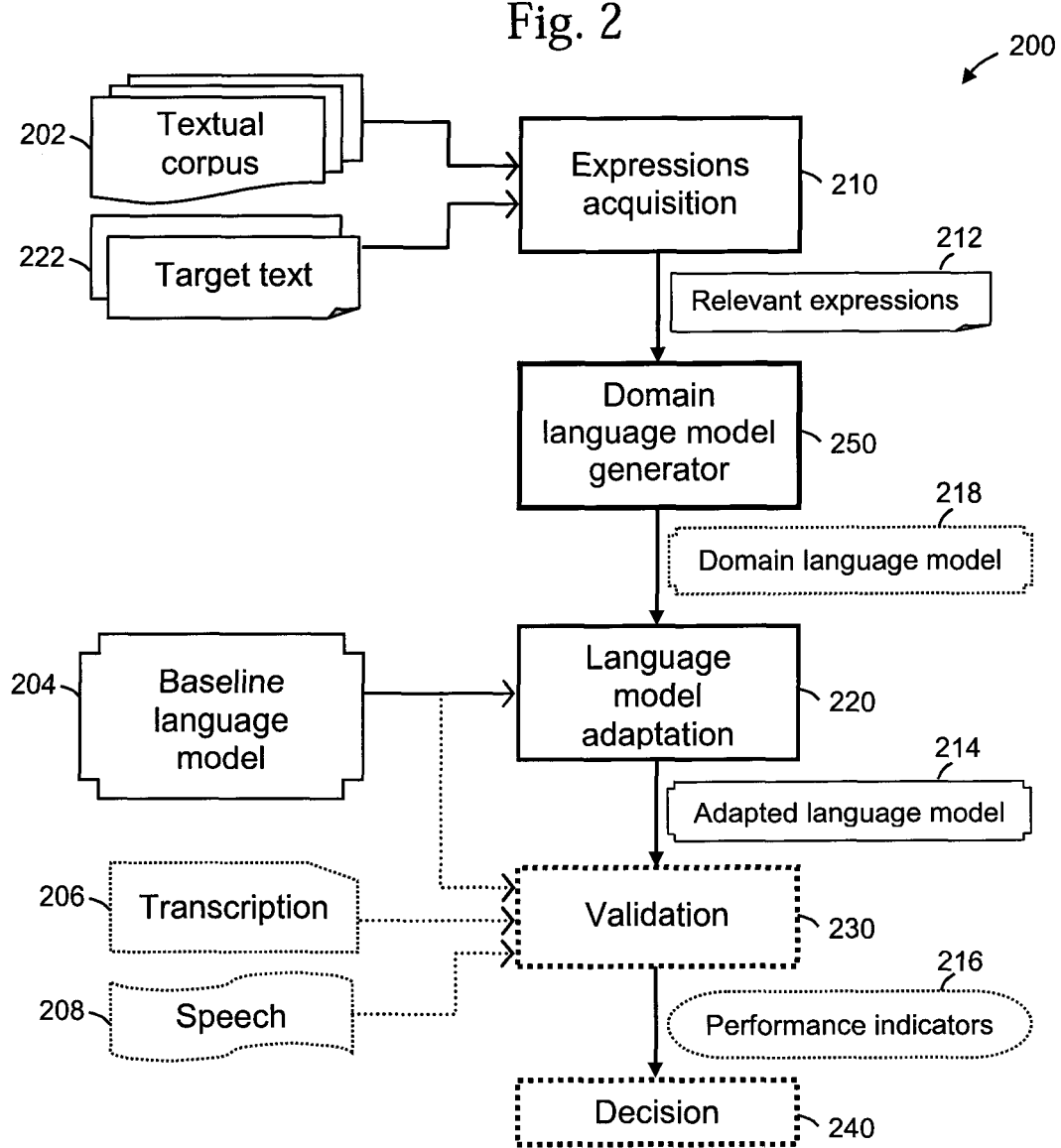
Figure 3:
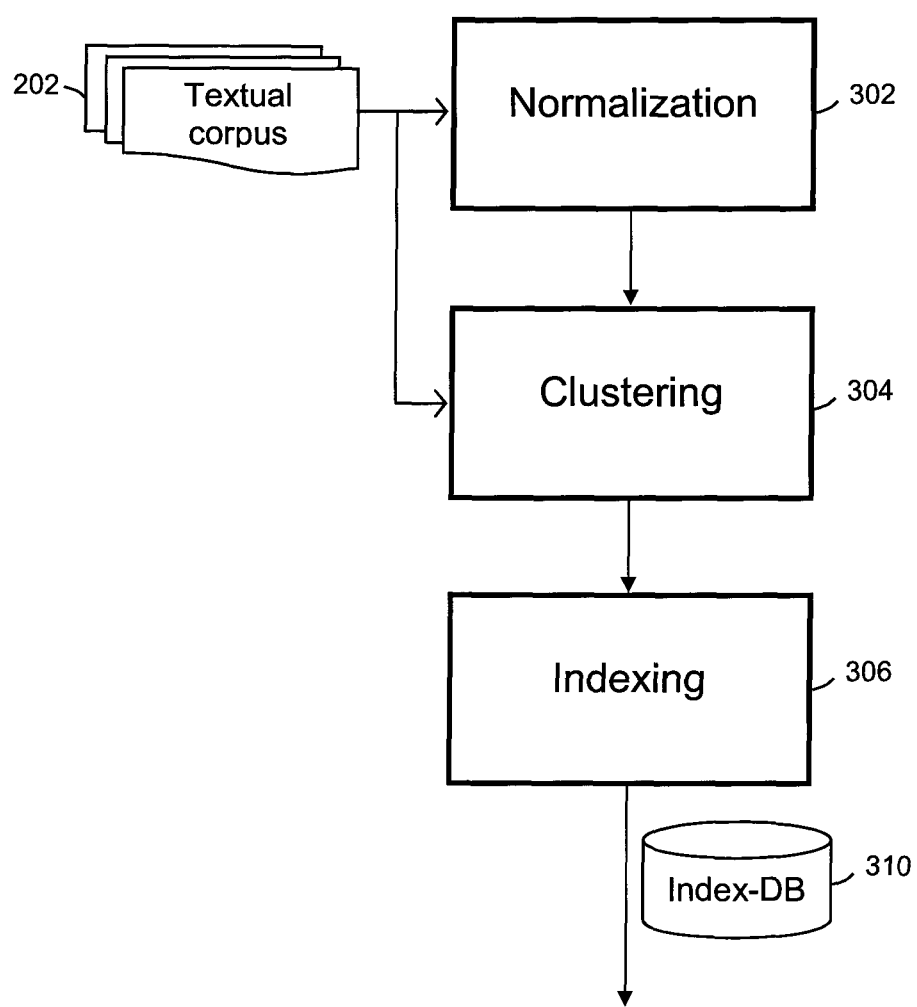
Figure 4:
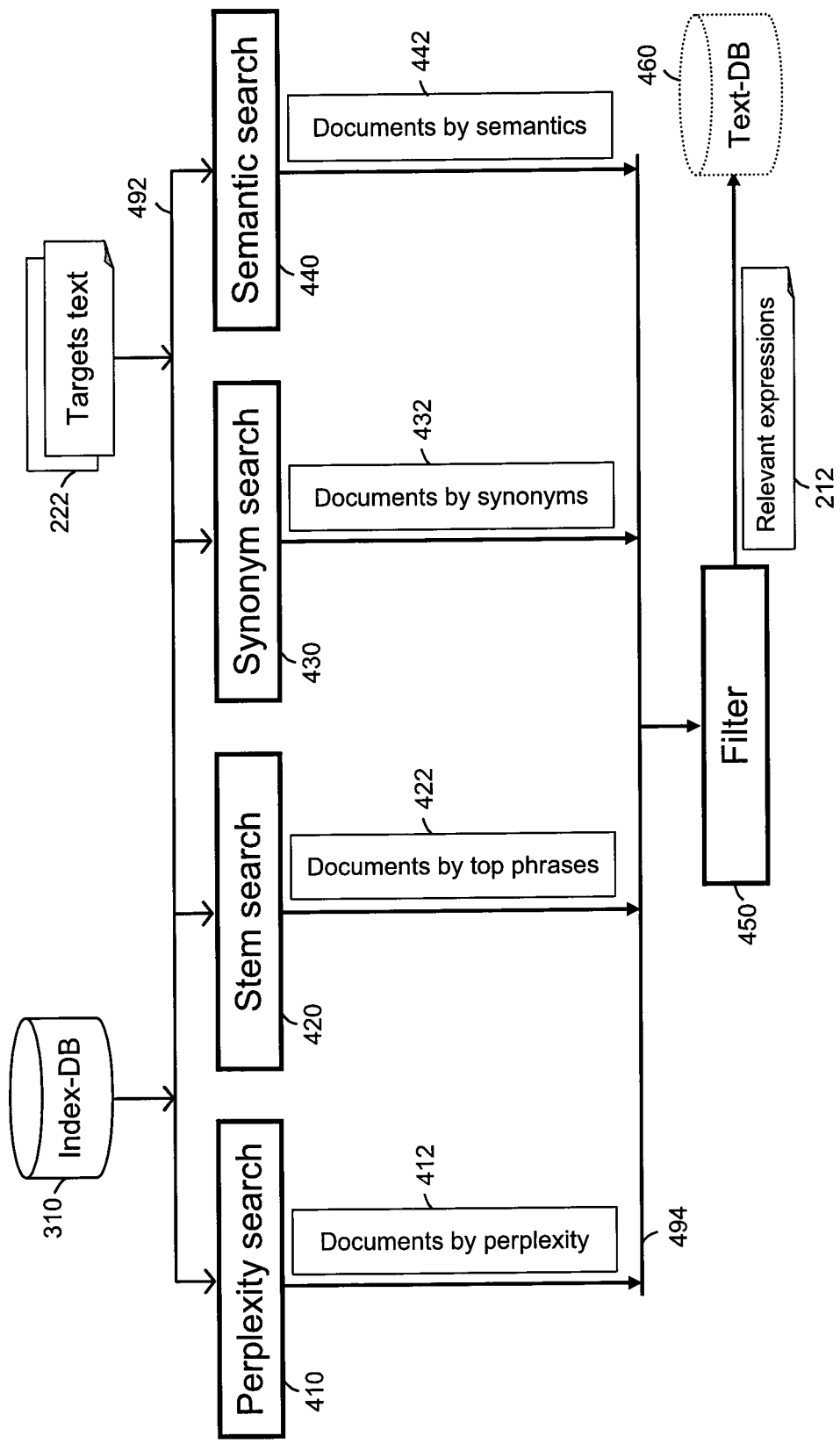
Figure 5:
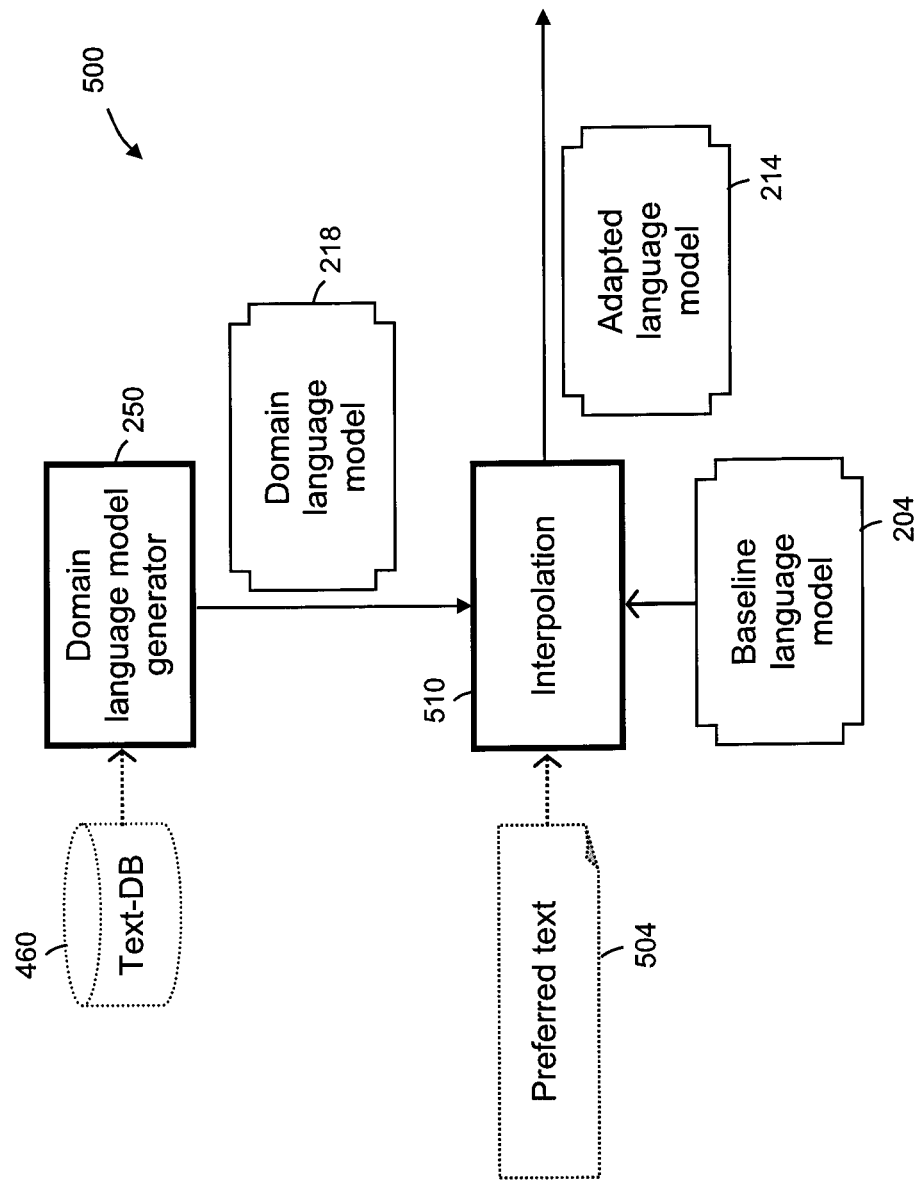

FIG. 1 schematically illustrates an apparatus for speech recognition;

FIG. 2 schematically outlines overall control flow for adapting a language model, according to exemplary embodiments of the disclosed subject matter;

FIG. 3 schematically outlines control flow for normalization and indexing, according to exemplary embodiments of the disclosed subject matter;

FIG. 4 schematically outlines control flow of searching the indexed corpus features and filtering the corresponding results, according to exemplary embodiments of the disclosed subject matter;

FIG. 5 schematically outlines control flow for generating a language model, according to exemplary embodiments of the disclosed subject matter; and FIG. 6 outlines operations in adapting a language model, according to exemplary embodiments of the disclosed subject matter.

DETAILED DESCRIPTION

Generally, in the context of the present disclosure, without limiting, a language model is any construct reflecting occurrences of words or textual terms in a given vocabulary, so that, by employing the language model, texts of and/or related to the vocabulary provided to the language model can be recognized, at least to a certain faithfulness, such as by a speech recognition apparatus.

Without limiting, a language model is a statistical language model where words or textual terms are assigned probability of occurrence, or weights, by means of a probability distribution. Such a model is referred to herein, representing any language model such as known in the art.

In the context of the present disclosure, without limiting, a baseline language model or a basic language model imply a language model trained and/or constructed with common everyday texts and/or unrelated to a particular subject matter as, for example, texts in which the distribution of words is generally and/or approximately as common in the respective spoken language.

In the context of the present disclosure, without limiting, a 'textual expression' implies a textual construct comprising a word or a sequence of words such as a sentence or a part thereof, without precluding textual constructs such as textual documents. For brevity and unless otherwise specified and/or evident from the context, the term 'expression' implies a textual expression.

In the context of some embodiments of the present disclosure, without limiting, the term 'textual corpus' implies a plurality of textual documents and/or a plurality of textual expressions, collectively referred to, unless otherwise specified, as 'documents'.

In the context of some embodiments of the present disclosure, without limiting, the term 'target text' implies one or more phrases and/or textual expressions generally related to some subject matter and/or context as a target field and/or field of interest.

In the context of some embodiments of the present disclosure, reference to text or a textual entity implies one or more words of a language, generally as encoded in a computer file or as any suitable form.

Some of the terms used herein are introduced and denoted later on in the present disclosure.

The terms cited above denote also inflections and conjugates thereof.

One technical problem dealt by the disclosed subject matter is enhancing a baseline language model with contents of a textual corpus that relate to a given target text, for increasing the recognition fidelity of speech related to the target text when used by an apparatus for speech recognition.

One technical solution according to the disclosed subject matter is incorporating in the baseline language model predominant terms derived from the textual corpus in accordance with the target text.

To expedite the derivation process, the contents of the textual corpus are streamlined such as by expanding abbreviations, correcting evident spelling errors and discarding extraneous terms such as stop-words and symbols, and the resulting words in the textual corpus are then stripped of inflections and conjugates to include only stems thereof which are further tagged to indicate the part of speech. The words, stems and part of speech tags are indexed, such as by vector of triplets, for prompt searches and retrievals.

Thereafter, by accessing and utilizing the indexed items, the contents of the textual corpus is analyzed and processed to obtain vocabulary thereof and derive relevant textual expressions which relate to and/or in accord with the target text based on a plurality of measures of relevancy to the target text. For example, rules for identifying phrases, perplexities, population and/or frequency of texts and assigning semantically related textual terms such as synonyms that relate to and/or with respect to the target text.

The derived relevant textual expressions are incorporated into the baseline language model probability distribution, thereby adapting and enhancing the baseline language model to cope with the context of the target text.

Optionally, in some embodiments, the recognition performance of the adapted language model is automatically checked by an apparatus for speech recognition relative to the baseline language model to validate whether a sufficiently better recognition is achieved by the adapted language model with respect to the context of the of the target text.

A potential technical effect of the disclosed subject matter is an apparatus for speech text recognition configured to enhance the reliability of textual recognition in a speech related to the target text.

FIG. 1 schematically illustrates an apparatus 100 for speech recognition, as known in the art or variation thereof.

The apparatus comprises an audio source of speech, represented schematically as a microphone 102 that generates an audio signal depicted schematically as an arrow 118. The audio signal is fed into a processing device 110 that converts or decodes the audio signal into a sequence or stream of textual items as indicated with symbol 112.

Generally, processing device 110 comprises an electronic circuitry 104 which comprises an at least one processor such as a processor 114, an operational software represented as a program 108, a speech recognition component represented as a component 116 and a speech decoder represented as a component 120. Optionally, component 116 and component 120 may be combined.

Generally, without limiting, component 116 comprises and/or employs three parts or modules (not shown) as (i) a language model which models the probability distribution over sequences of words or phrases, (ii) a phonetic dictionary which maps words to sequences of elementary speech fragments, and (iii) an acoustic model which maps probabilistically the speech fragments to acoustic features.

The audio signal may be a digital signal, such as VoIP, or an analog signal such as from a conventional telephone. In the latter case, an analog-to-digital converter (not shown) comprised in and/or linked to processing device 110 such as by an I/O port is used to convert the analog signal to a digital one.

Thus, processor 114, optionally controlled by program 108, employs the language model, optionally together with any necessary components of processing device 110, to recognize phrases expressed in the audio signal and generates textual elements such as by methods or techniques known in the art and/or variations or combinations thereof.

In some embodiments, program 108 and/or component 116 and/or component 120 and/or parts thereof are implemented in software and/or one or more firmware devices such as represented by an electronic device 106 and/or any suitable electronic circuitry.

A general non-limiting overview of practicing the present disclosure is presented below, outlining exemplary practice of embodiments of the present disclosure and providing a constructive basis for variant and/or alternative and/or divergent embodiments, some of which are subsequently described.

Generally, textual data, denoted also as textual corpus, is obtained from one or more sources and processed to obtain textual expressions and/or document, denoted also as relevant textual expressions or relevant expressions, which characterize the textual corpus according to a provided target text. The relevant textual expressions are used to adapt a baseline language model for improving or enhancing speech recognition of contexts related to the target text.

The textual corpus may be obtained from one or more sources, such as the Web, emails, chats, social networks, or any other textual source such as internal documents of an organization in which and/or for which the language model is adapted.

In some embodiments, the textual corpus may be deliberately obtained from textual resources which, at least partially, are directed to a certain subject matter, so that the baseline language model may, at least potentially, be adapted for enhanced speech recognition focused at or directed to contexts related to the particular subject matter.

Optionally and/or alternatively, in some embodiments, the textual corpus may be obtained from indiscriminate and/or random textual resources, so that the baseline language model can be adapted for a variety of target domains.

Thus, the textual corpus is used as a resource or a supply of texts to derive therefrom textual expressions and/or documents that are relevant and/or tuned to the target text, for the context of which the baseline language model is adapted or enhanced.

On one hand, obtaining textual corpus directed to the subject matter of the target text may provide textual expressions suitable for higher recognition fidelity of speech of the context of the target text. On the other hand, obtaining textual corpus directed to indiscriminate subject matter may provide terms of wider scope which was not expected beforehand, thus, potentially at least, enriching and/or enhancing the speech recognition.

At least potentially, the enhancement or adaptation of the baseline language model may not be sufficient relative to the baseline language model per se with respect to speech recognition of contexts related to the target text. Therefore, in order to confirm or refute the adaptation, the performance in speech recognition of contexts related to the target text of the adapted language model relative to the baseline language model is automatically evaluated. Consequently, based on the automatic evaluation a decision is automatically determined, resolving which of the language models is more appropriate for speech recognition of contexts related to the target text.

Optionally, in case the performance of the adapted language model is not sufficiently better than the baseline language model, the textual corpus is supplemented and/or replaced with other textual data and the adaptation, followed by automatic evaluation, is repeated.

It is noted that, in some embodiments, the validation of the adaptation is not mandatory. For example, it is probable or expected that the speech recognition by adapted language model is not inferior to the baseline language model given that, after all, the adapted language model is based on the baseline language model and is not likely to perform worse than the baseline language model.

FIG. 2 schematically outlines overall control flow 200 between components for adapting a language model, along with respective inputs thereof, according to exemplary embodiments of the disclosed subject matter.

Generally, inputs are indicated by open-ended arrows, and control flow along with forwarded data is indicated by close-ended arrows, and optional constituents are indicated by dotted elements.

A textual corpus, denoted also as a textual corpus 202, and a target text, denoted also as target text 222, are provided to an expressions acquisition component, denoted also as a expressions acquisition 210, which identifies in and/or obtains and/or acquires from the textual corpus textual expressions, denoted also as relevant expressions 212, that pertain and/or relevant and/or similar to the target text.

The target text comprises one or more phrases and/or textual expressions that are set and/or determined and/or selected and/or otherwise attained, representing and/or characterizing a context intended or targeted or aimed for recognition of speech related to the context.

In some embodiments, relevant expressions 212 acquired from textual corpus 202 are provided to a language model generation component, denoted also as a domain language model generator 250, which generates or constructs a language model, denoted also as domain language model 218, based on relevant expressions 212.

In some embodiments, a baseline language model, denoted also as a baseline language model 204, is provided with relevant expressions 212 or optionally with domain language model 218 to a language model adaptation component, denoted also as a language model adaptation 220, which adapts, by merging, such as by interpolation, of relevant expressions 212 or optionally domain language model 218 with baseline language model 204 to form or construct an adapted language model which is denoted also as an adapted language model 214.

In case validation of the adapted language model is determined and/or preset, the adapted language model and the baseline language model are provided to an evaluation component, denoted also as a validation 230, for evaluating the relative speech recognition performance of the adapted language model and the baseline language model. The performance of language models is judged by recognition or decoding of a provided speech, denoted as a speech 208, relative to a provided transcription of the speech that is sufficiently accurate, denoted also as transcription 206.

In some embodiments, transcription 206 may be obtained by a human transcribing speech 208. Optionally or alternatively, transcription 206 is obtained from decoding apparatus, such as apparatus 100 and/or variation thereof, employing a sufficiently faithful language model. Further optionally or alternatively, transcription 206 is a provided text while speech 208 is obtained by a suitable apparatus that converts text to speech.

Generally, the speech relates to the subject matter and/or context of the target text corpus, and the speech recognitions of the adapted language model and the baseline language model are compared to the transcription. Performance indicators that indicate the quality of the respective recognitions are thereby obtained denoted also as performance indicators 216. For example, performance indicators 216 comprise the error rate of decoding of speech 208 by adapted language model 214 and the error rate of decoding of speech 208 by baseline language model 204. Optionally or alternatively, performance indicators 216 comprise other indicators such as perplexities with respect to a given text of adapted language model 214 and baseline language model 204.

The recognition performance indicators are provided to a decision component, denoted also as decision 240, for deciding on or election of a language model. The decision component decides or resolves whether the adapted language model or the baseline language model are elected for possible further use for speech recognition by a speech recognition apparatus, such as apparatus 100 and/or variations thereof.

It is noted that the components cited above are automatically operational on an at least one computerized apparatus, such as a personal computer or a server, independently of a user supervision and/or intervention.

In order to simplify handling and/or referencing the contents of the textual corpus, the texts of the textual corpus is re-formed, comprising but not limited to the following operations that are referred to also as normalization.

(i) Expanding of abbreviations, for example, 'ASAP' is expanded to 'as soon as possible', or 'DIY' is expanded to 'do it yourself'. Some well known or established abbreviations, however, are not or may not be expanded, for example, 'DNA'. Optionally, numerals are expanded to corresponding words. The expansion of abbreviations may be based on a dictionary or a glossary that are automatically accessible, such as online or stored files, such as http://www.disabled-world.com/communication/text-shortcuts.php.

(ii) Correction of evident spelling errors or expected intention, for example, 'helllloooo' is replaced by 'hello'. The corrections may be based on automatically accessible lookup table for corrections akin to Word (Microsoft inc.) or on similar facilities.

(iii) Removal of extraneous text or symbols considered as non-relevant, for example, punctuation marks, stop-words, special symbols or constructs such as email addresses or URLs. The extraneous text or special symbols and constructs may be identified and located such as by regular expressions. For example, email addresses may user a regular expression such as €\b[A-Z0-9._%+-]+@[A-Z0-9.-]+\.[A-Z]{2,4}\b.€,, where the Euro signs ((€)) are used to mark the boundaries of the regular expression and are not part thereof.

The extraneous text or special symbols and constructs may be automatically retrieved or accessed from custom or ready tables or glossaries, for example, stop-words may be automatically found, for example, in http://www.ranks.nl/resources/stopwords.html.

(iv) Stemming of words to the grammatical stems as known in the art, such as from dictionaries that are automatically accessible, or according to algorithms and techniques as found, for example, in http://tartarus.org/martin/PorterStemmer/ or http://xapian.org/docs/stemming.html.

It is noted that the contents of the textual contents are preserved, and the results of the normalization, at least in some embodiments, are kept aside of the contents of the textual corpus.

Further to normalization, the part of speech (POS) of each stem is identified. In some embodiments, an arrangement, such as a vector, of items comprising two or three elements is formed including the stem and POS of a word or the word or also the word too, for example, [step, POS] or [word, stem, POS], respectively. Parts of speech are identified such as know in the art, for example, http://rdrpostagger.sourceforge.net/ or http://ucrel.lancs.ac.uk/claws/.

Further on, in each document of the textual corpus key phrases that are determined as relevant and/or representative of the textual corpus and/or documents thereof are identified. In some embodiments, the key phrases are identified by patterns using, for example, regular expressions and/or any suitable algorithm or technique. Optionally, prepositions and/or stop-words and/or other intermediary words such as 'and' or 'or' are ignored in the identification of key phrases. Optionally or additionally, key phrases are identified based stems of words as obtained in the normalization described above.

Thus, key phrases may be identified by patterns, such as {verb1 verb2} or {name verb subject}, for example, respectively, {dial call} or {customer complains product}. Optionally, parts of key phrases may overlap each other and/or overlap other key phrases and/or key phrases may include parts of other key phrases.

Subsequently, number of occurrences of key phrases or frequency thereof in each document of the textual corpus determined, such as by sorting. The N top ranking or frequent key phrases are designated as a topic of the respective document. In some embodiments, the value of N is 5, yet any number determined as sufficient for topic designation may be used, typically though not limited to a number less than 10. In some embodiments, different values of N may be used for different documents.

Further on, in some embodiments, semantic representation of each document of the textual corpus is obtained such as known in the art. For example, http://cocosci.berkeley.edukom/papers/topicsreview.pdf, https://nltk.googlecode.com/svn/trunk/doc/contrib/sem/hole.html.

In some embodiments, the semantic representation is formed as a vector and/or any suitable construct, collectively also referred to a semantic vector.

Data obtained and/or derived from each of the documents of the textual corpus by normalization and further data obtained from the further processing such as topics or key phrases, denoted also collectively as corpus features, are grouped and/or clustered in one or more data structures, collectively referred to also as a feature cluster, each feature cluster relating to a document of the textual corpus. Optionally, a feature cluster relates to a plurality of documents.

In some embodiments, a feature cluster respective to a document of the textual corpus comprises, but not limited to, the following elements:
  List of words appearing in the text.
  List of stems of words appearing in the text.
  List of key phrases and frequency thereof
  List of topics.
  Semantic vector.
  Indication, such as by a link, of the respective document of the elements as above.

In some embodiments, the feature clusters are indexed, either per a document and/or per a plurality of documents, in a suitable structure, such as in a database, collectively referred to as a database.

Thus, having created the indexes of the documents, contents of the documents and data derived therefrom may be conveniently accessed and/or retrieved, avoiding any repeated and/or elaborate and/or superfluous processing of the documents.

In some embodiments, documents having the same and/or similar and/or related topics are grouped to represent one document. The grouping may be on concatenation of the documents, or, optionally, by some relations therebetween such as links, addresses or indexes.

In some embodiments, a document and/or grouped documents are used to construct a language model, for example, when the document and/or grouped documents are determined to have a sufficiently large quantity of words.

In such a case where a language model is constructed it is further comprised on the corpus features.

FIG. 3 schematically outlines control flow for normalization and indexing such as described above, according to exemplary embodiments of the disclosed subject matter.

Textual corpus 202 is provided to a computerized component for normalization of textual corpus 202, denoted also as normalization 302. Textual corpus 202 is further provided to and/or accessible by a computerized component for clustering, denoted also as clustering 304, which groups and/or clusters and/or forms the corpus features in feature clusters.

The feature clusters and/or language models derived therefrom are provided to a computerized component for indexing the feature clusters, denoted also as indexing 306, which indexes the feature clusters in a database, denoted also as an index-DB 310.

Data of the feature clusters, such as indexed in a database as index-DB 310, are accessed and/or retrieved and contents thereof is searched by one or more computerized methods and/or techniques. The search results are filtered and/or otherwise processed to yield relevant phrases that are relevant to and/or characterize the textual corpus according to provided target text.

FIG. 4 schematically outlines control flow of searching the indexed corpus features and filtering the corresponding results, according to exemplary embodiments of the disclosed subject matter.

Generally, inputs are indicated by open-ended arrows, and control flow along with forwarded data, is indicated by close-ended arrows.

In some embodiments, the searches are carried out by four computerized search components, referred to also as search components, as described below. As indicated by arrows 492, inputs for the search components comprise feature clusters in index-DB 310 and one or more texts, referred to also as target text and denoted also as target text 222.

The target text may comprise a one or more phrases or textual expressions and/or one or more textual documents, where that latter may comprise a plurality of textual expressions.

One search component, referred to as a perplexity search 410, computes the perplexities of the targets texts 222 with respect to the language models which are corpus feature of each document or group of documents in index-DB 310.

Perplexities are determined, as known in the art, for example, as in Gales M J F, Young S, *The application of hidden Markov models in speech recognition, Foundations and Trends in Signal Processing,* 2008, 1(3): 195-304, or Philipp Koehn, *Statistical Machine Translation,* ISBN 9780521874151.

Perplexity search 410 yields as a result P documents in index-DB 310 having the least computed perplexities, where P is a preset or a determined number, for example, P is 5. Optionally or alternatively, the result of perplexity search 410 includes the documents in index-DB 310 having perplexities below a preset or a determined threshold.

The result obtained from perplexity search 410, in any form thereof, is denoted as documents by perplexity 412.

Another search component, referred to as a stem search 420, searches the corpus features in index-DB 310 for stems according to stems in index-DB 310 respective to documents of the textual corpus.

In case target text 222 include individual phrases such as textual expressions, the stems of the phrases are used for searching stems in index-DB 310, whereas in case target text 222 include documents, key phrases are identified in the documents, such as described above, and stems thereof are used for searching stems in index-DB 310.

Stem search 420 yields as a result documents in which stems of target text 222 appear at least Q times, where Q is a preset or a determined number, for example, Q is 5.

In case stems of target text 222 appear less than Q times, then if the search was conducted based on phrases in target text 222 then stem search 420 yields as a result sentences of documents wherein the target text appear as judged by the respective stems, otherwise, if the search was conducted based on documents in target text 222 then stem search 420 yields as a result documents which have the key phrases as a topic of the documents which is determined as described above.

The result obtained from stem search 420, in any form thereof, is denoted as documents by top phrases 422.

Another search component referred to as a synonym search 430, converts words in target text 222 to synonyms thereof and uses the synonyms as described for stem search 420. Thus synonym search 430 yields results that would have been obtained by stem search 420 in case target text 222 would have been constructed with synonyms thereof, for example, by step-wise replacing words with different synonyms. Optionally, words in target text 222 are converted to synonyms and further provided to stem search 420 to obtain results as described above for stem search 420.

Words may be converted to synonyms using suitable dictionary automatically accessible, such as online or stored files, for example, http://synonyms.memodata.com or http://www.synonymy.com.

The result obtained from synonym search 430 is denoted as documents by synonyms 432.

Another search component, referred to as a semantic search 440, searches the corpus features in index-DB 310 according to semantic similarity to target text 222.

Semantic similarity may be obtained by methods as known in the art, such as by a semantic distance or a semantic mapping or a semantic data extractor as described, for example, in E. Gabrilovich and S. Markovitch, *Computing semantic relatedness using wikipedia-based explicit semantic analysis, Proceedings of The* 20*th International Joint Conference on Artificial Intelligence*, Hyderabad, India, January 2007.

Semantic search 440 further searches the corpus features in index-DB 310 according to semantic similarly such as determined by semantic distances, yielding as a result S documents having the least semantic distances, where S is a preset or a determined number, for example, S is 5. Alternatively, semantic search 440 yields as a result documents having determined sufficient semantic similarity, for example, documents having semantic distances below a preset or a determined threshold.

The result obtained from semantic search 440, in any form thereof, is denoted as documents by semantics 442.

In order to streamline or simplify the contents of the results of the search components, the results are provided to a filtering component, denoted also as a filter 450, which searches the documents of the results and removes or filter out redundant duplicates, thereby yielding streamlined documents. The streamlined documents thus include textual expressions that are relevant to target text 222 as relevant expressions 212.

In some embodiments, the streamlined documents, or relevant expressions 212, are stored in a database for convenient access and/or retrieval, denoted as text database and also as text-DB 460.

In some embodiments, filtering of the results of the search components is not preformed and the results are considered and/or referred to as the relevant expressions.

In some embodiments, the documents of results of the search components are arranged in some handy structure. In some embodiments, the documents are arranged in a 4-dimension vector or matrix, where, for example:

The first dimension holds the perplexity factor.
The second holds the number of phrases occurrences within a document.
The third holds the number of synonyms phrases occurrences within a document.
The Fourth holds the semantic distance.

The vector or matrix is arranged according to provided parameters or criteria, as, for example:

Importance dimensions.
Criteria such as for P, Q, S cited above or semantic distance threshold.
Total number of documents to provide.

In some embodiments, the number of search components may be smaller than four or larger than four, yet keeping the scheme of a variety of search techniques for identifying various relevancies of the corpus features to target text 222.

It is noted that referring above to phrases and documents may denote, according to the prevailing circumstances, one phrase or one document, respectively.

It is noted that the order of operations or execution of the search performance is or may be immaterial, including, optionally, sequential performance and/or concurrent at least partially. For example, the search components may be operated by concurrent tasks or threads, optionally on different processors or different computerized apparatuses.

FIG. 5 schematically outlines control flow 500 for generating a language model, according to exemplary embodiments of the disclosed subject matter.

Generally, inputs are indicated by open-ended arrows, and control flow along with forwarded data, is indicated by close-ended arrows, and optional or alternative constituents are indicated by dotted elements.

The Relevant expressions are optionally stored in and subsequently retrieved from text-DB 460. The relevant expressions may be obtained or acquired from the documents of the results of the search components, optionally after filtering thereof, as individual words or textual expressions.

Textual terms of the relevant expressions are provided as a training data to domain language model generator 250 for forming or generating domain language model 218. Forming a language model is according to or as known in the art, for example by the Kneser-Ney method, or other methods such as in http://www.speech.sri.com/projects/srilm/manpages/ngram-discount.7.html.

Domain language model 218 and baseline language model 204 are provided to a computerized component for language models interpolation, denoted as an interpolation 510, which interpolates domain language model 218 and baseline language model 204 to generate adapted language model 214.

The interpolation of domain language model 218 and baseline language model 204 is by methods as or according to the art. For example, as in Liu, Xunying, Mark J F Gales, and Philip C. Woodland. "*Use of contexts in language model interpolation and adaptation.*" *Computer Speech & Language* (2012) or in Bo-June (Paul) Hsu, *GENERALIZED LINEAR INTERPOLATION OF LANGUAGE MODELS, MIT Computer Science and Artificial Intelligence Laboratory*, 32 Vassar Street, Cambridge, Mass. 02139, USA.

In some embodiments, the interpolation is further based on desired or preferred text, referred to also as preferred text 504, that, for example, represents context for which adapted language model 214 is adapted.

Thus, preferred text 504 is provided to interpolation 510 which determines sufficiently good and/or best interpolation weights to minimize and/or diminish a perplexity of interpolated adapted model 506 with respect to preferred text 504.

In some embodiments, the relevant expressions are used for adapting baseline language model 204 without forming a domain language model nor without using interpolation. The adaptation may refine the baseline language model directly using the relevant expressions.

Adapted language model 214 generated as described in overall control flow 200 and further described in control flow 500, may not perform sufficiently better than baseline language model 204 in decoding speech having a context of and/or related to that of target text 222.

Thus, in some embodiments, the performance of adapted language model 214 relative to the performance of baseline language model 204 in speech decoding is evaluated, such as outlined in overall control flow 200 with respect to validation 230 and decision 240. Generally, the performance of speech decoding is determined by employing a speech decoding apparatus such as apparatus 100 or a variation thereof.

The evaluation is based on measurements such as word error rates and/or perplexities. The evaluation may employ methods that include supervision by humans and/or unsupervised methods.

An exemplary unsupervised method includes the following operations:

Decoding a given speech by employing the baseline language model together with a provided suitable acoustic model by a speech decoding apparatus, thereby obtaining a 'baseline reference transcription' thereof.

Decoding a given speech by employing the baseline language model together with a provided 'weak' acoustic model by a speech decoding apparatus, thereby obtaining a 'weak baseline reference transcription' thereof. A 'weak' acoustic model refers to a model that has less predictive power than the baseline acoustic model.

Decoding a given speech by employing the adapted language model together with the provided 'weak' acoustic by a speech decoding apparatus, thereby obtaining a 'weak adapted transcription' thereof Comparing the 'weak baseline reference transcription' to the 'baseline reference transcription', thereby obtaining a "baseline word error rate difference".

Comparing the 'weak adapted reference transcription' to the 'baseline reference transcription', thereby obtaining an 'adapted word error rate difference'.

Comparing the 'adapted word error rate difference' to the 'baseline word error rate difference'. If the 'adapted word error rate difference' is sufficiently lower than the "baseline word error rate difference' then the adapted language model is selected for decoding, otherwise the baseline language model is selected for decoding. The sufficiently lower difference is determined, at least in some embodiment, by a threshold as described below.

The language models are employed on speech recording apparatus, such as apparatus 100 or a variation thereof, together with corresponding acoustic models which map probabilistically the speech fragments to acoustic features. Further, optionally, the language models are employed together with corresponding phonetic dictionaries which map words to sequences of elementary speech fragments.

Unsupervised evaluation may use techniques of the art, such as in Strope, B., Beeferman, D., Gruenstein, A., & Lei, X (2011). *Unsupervised Testing Strategies for ASR. In INTER-SPEECH* (pp. 1685-1688).

Having obtained the word error rates as described above, in case the error rate based on the adapted language model is significantly lower than the error rate based on the baseline language model with respect to a speech then the adapted language model is elected for possible further use. Otherwise, the baseline language model is elected or the adaptation is started anew such as with different textual corpus and/or different target text.

An error rate may be determined as significantly lower than another error rate by a threshold, such as in the formula below:

$$(WER[\text{Baseline}] - WER[\text{adapted}]) > Te$$

Where, WER[Baseline] and WER[adapted] are the error rates of the baseline language model and the adapted language model, respectively, and Te is a threshold that may be preset and/or determined. For example, Te may be determined by statistic measures, such as entropy of the adapted language model and/or the baseline language model.

FIG. 6 outlines operations 600 in adapting a language model, according to exemplary embodiments of the disclosed subject matter.

In operation 602 a textual corpus of a plurality of documents, the documents comprising textual expressions, are obtained from one or more of various sources. The textual corpus is intended to as a resource or a stock of text for language model adaptation.

In operation 604 documents of the textual corpus are determined as relevant to a provided target text based on a plurality of different relevancy determinations between the documents and the target text.

Exemplary different relevancy determinations, without limiting, are:

A determination by perplexities of the indexed language model or language models with respect to the target text.

A determination of matches between stems of words in the textual expressions of the documents of the textual corpus and stems of words of the target text.

A determination of matches between synonyms of words in the textual expressions of the documents of the textual corpus and words of the target text.

A determination of semantic similarities of words in the textual expressions of the documents of the textual corpus and words of the target text.

In some embodiments, the contents of the documents are streamlined and simplified, such as by stemming and expansion of abbreviations and removing superfluous terms, and the results are indexed for expediting referencing thereof and thus expediting the relevancy determinations.

In operation 606 textual expressions from the documents determined as relevant to the target text are incorporated in a provided baseline language mode, thereby forming or generating an adapted language model adapted for recognizing terms of a context of the target text. For example, recognition of speech related to the target text using an apparatus such as apparatus 100 or variations thereof.

In some embodiments, the incorporation is carried out by an interpolation directed to diminish a perplexity of the adapted language model with respect to a provided preferred text. Optionally, the preferred text is equivalent and/or similar, such as by semantic similarity, to the target text.

In some embodiments, the incorporation is carried out via and/or using an intermediary language model formed from the documents determined as relevant to the target text.

In operation 608, the performance of the adapted language model relative to the respective performance of the baseline language model is evaluated, consequently determining which of the language models is more suitable for decoding, or recognizing, textual term in speech related to and/or or of context of the target text.

As indicated by dashed frame and arrow, operation 608 is an optional operation that is carried out in case validation of the performance of the adapted language model is determined or set as required.

In some embodiments, in case the adapted language model is determined as insufficiently better than the baseline language model, operations 600 are started anew using different textual corpus and/or different target text. The repetitions of operations 600 are limited by some condition (not shown). For example, the performance of the adapted language model becomes sufficiently better than the baseline language model or a preset number of repetitions were done.

Table-1 and Table-2 below show experimental results of word error rates and portion of detection of terms as achieved by a baseline language model and an adapted language model according to exemplary embodiments of the disclosed subject matter.

Table-1 and Table-2 depict results of two speech recognitions obtained in two sites from speech related to some respective subject matter.

TABLE 1

Site I

| | Word Error Rate (%) | Portion of Detection (%) |
|---|---|---|
| Baseline language model | 68.10 | 35.44 |
| Adapted language model | 56.33 | 48.47 |

TABLE 2

Site II

| | Word Error Rate (%) | Portion of Detection (%) |
|---|---|---|
| Baseline language model | 76.18 | 28.55 |
| Adapted language model | 60.31 | 48.32 |

It is thus evident that the adapted language model exhibits lower error rates and larger detection percentage relative to the baseline language model.

There is thus provided according to the present disclosure a computerized method for adapting a baseline language model, comprising obtaining a textual corpus of documents that comprise textual expressions, incorporating in the baseline language model textual expressions from documents which are determined as relevant to a provided target text based on a plurality of different relevancy determinations between the documents and the provided target text, thereby adapting the baseline language model to form an adapted language model for recognizing terms of a context of the provided target text, wherein the method is automatically performed on an at least one computerized apparatus configured to perform the method.

In some embodiments, the plurality of different relevancy determinations comprises a determination by perplexities of the indexed language models with respect to the target text.

In some embodiments, the plurality of different relevancy determinations comprises a determination of matches between stems of words in the textual expressions in the documents and stems of words of the provided target text.

In some embodiments, the plurality of different relevancy determinations comprises a determination of matches between synonyms of words in the textual expressions of the documents and words of the provided target text.

In some embodiments, the plurality of different relevancy determinations comprises a determination of semantic similarities of words in the textual expressions of the documents and words of the provided target text.

In some embodiments, the textual expressions from the documents which are determined as relevant to the provided target text are filtered by removing redundant duplicates.

In some embodiments, the incorporation of the relevant expressions in the baseline language is carried out by an interpolation directed to diminish a perplexity of the adapted language model with respect to a provided preferred text.

In some embodiments, the incorporation of the relevant expressions in the baseline language model is carried out by way of an intermediary language model formed with the textual expressions from the documents which are determined as relevant to the provided target text.

In some embodiments, stems of words in the documents of the textual corpus are indexed for expediting references thereof, thus expediting performances of the plurality of different relevancy determinations.

In some embodiments, the method further comprises evaluating the performance of the adapted language model in recognizing speech related to the provided target text relative to the respective performance of the baseline language model, consequently determining which of the cited language models is more suitable for decoding speech related to the provided target text.

There is thus further provided according to the present disclosure a computerized apparatus configured for automatically performing the method.

In the context of some embodiments of the present disclosure, by way of example and without limiting, terms such as 'operating' or 'executing' imply also capabilities, such as 'operable' or 'executable', respectively.

Conjugated terms such as, by way of example, 'a thing property' implies a property of the thing, unless otherwise clearly evident from the context thereof.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a computerized system or a similar term denotes an apparatus comprising one or more processors operable or operating according to one or more programs.

As used herein, without limiting, a module represents a part of a system, such as a part of a program operating or interacting with one or more other parts on the same unit or on a different unit, or an electronic component or assembly for interacting with one or more other components.

As used herein, without limiting, a process represents a collection of operations for achieving a certain objective or an outcome.

As used herein, the term 'server' denotes a computerized apparatus providing data and/or operational service or services to one or more other apparatuses.

The term 'configuring' and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A computerized method for adapting a baseline language model, comprising:
   obtaining a textual corpus of documents that comprise textual expressions;
   incorporating in the baseline language model textual expressions from documents which are determined as relevant to a provided target text based on a plurality of different relevancy determinations between the documents and the provided target text, thereby adapting the baseline language model to form an adapted language model for recognizing terms of a context of the provided target text,
   wherein a first relevancy determination comprises a determination by sufficiently small evaluated perplexities of the baseline language model with respect to the target text, and
   wherein a second relevancy determination comprises a determination of matches between stems of words in the textual expressions in the documents and stems of words of the target text, and
   wherein a third relevancy determination comprises a determination of matches between words in the textual expressions of the documents with words of the target text that for the matching have been converted to synonyms thereof according to a preset dictionary of synonyms, and
   wherein a fourth relevancy determination comprises a determination of semantic similarities of words in the textual expressions of the documents and words of the target text based on semantic distance and reduction thereof, and
   wherein the method is automatically performed on an at least one computerized apparatus configured to perform the method.

2. The method according to claim 1, wherein the textual expressions from the documents which are determined as relevant to the provided target text are filtered by removing redundant duplicates.

3. The method according to claim 1, wherein said incorporating in the baseline language is carried out by an interpolation directed to diminish a perplexity of the adapted language model with respect to a provided preferred text.

4. The method according to claim 1, wherein said incorporating in the baseline language model is carried out by way of an intermediary language model formed with the textual expressions from the documents which are determined as relevant to the provided target text.

5. The method according to claim 1, wherein stems of words in the documents of the textual corpus are indexed for expediting references thereof, thus expediting performances of the plurality of different relevancy determinations.

6. The method according to claim 1, further comprising evaluating the performance of the adapted language model in recognizing speech related to the provided target text relative to the respective performance of the baseline language model, consequently determining which of the cited language models is more suitable for decoding speech related to the provided target text.

* * * * *